(12) United States Patent
Hernandez et al.

(10) Patent No.: US 6,669,035 B1
(45) Date of Patent: Dec. 30, 2003

(54) INDEXING PARTS RACK

(75) Inventors: Olimpia Maria Hernandez, Birmingham, MI (US); Mark Lyjak, Washington, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/178,416

(22) Filed: Jun. 24, 2002

(51) Int. Cl.[7] ................................................. A47F 5/00
(52) U.S. Cl. ........................................................ 211/126
(58) Field of Search ........................................ 211/162

(56) References Cited

U.S. PATENT DOCUMENTS

| | | | | | |
|---|---|---|---|---|---|
| 5,303,815 A | * | 4/1994 | Dooley | ........................ | 198/680 |
| 5,566,815 A | * | 10/1996 | Dooley | ..................... | 198/687.1 |
| 5,697,508 A | * | 12/1997 | Rifkin et al. | ................ | 211/162 |
| 5,782,447 A | * | 7/1998 | Hoffend | .................... | 248/227.1 |
| 5,927,472 A | * | 7/1999 | Neef et al. | ................ | 198/465.4 |
| 6,513,646 B1 | * | 2/2003 | Olsen | ....................... | 198/465.4 |
| 6,564,929 B2 | * | 5/2003 | Reisacher | ................ | 198/687.1 |

* cited by examiner

*Primary Examiner*—Daniel P. Stodola
*Assistant Examiner*—Erica B Harris
(74) *Attorney, Agent, or Firm*—Laura C. Hargitt

(57) ABSTRACT

An indexing parts rack for supporting a plurality of objects includes an elongated track having a longitudinal axis and at least one hanger assembly mounted on the track. The hanger assembly is movable along the track in a direction of the longitudinal axis and is rotatable about the longitudinal axis. The indexing parts rack also includes a stop positioned adjacent the track whereby when no object is supported from the hanger assembly, the hanger assembly assumes a first position relative to the longitudinal axis to enable the hanger assembly to move along the track past the stop. When an object is supported from the hanger assembly, the hanger assembly rotates relative to the longitudinal axis to a second position to engage the stop and prevent the hanger assembly from moving past the stop along the track.

14 Claims, 5 Drawing Sheets

INDEXING PARTS RACK

BACKGROUND OF THE INVENTION

The present invention relates generally to storage racks and, in particular, to an indexing parts rack.

Storage racks having indexing properties are well known. Places such as commercial cleaners have cleaned items that hang from hooks attached to a chain where the chain indexes mechanically. Meat factories and trucks hang large slabs of meat from hooks attached to a frame. Other prior art racks exist that include a rack that indexes forward but includes electronic controls and a motor to advance the hanging parts, which makes the rack disadvantageously expensive and requires considerable maintenance.

It is also common to store large parts, such as modular automotive headliners, in a vertical orientation because higher part density can be achieved than in a horizontal orientation for the same size container. These parts must be shipped either separated from each other or with some type of physical protector between adjacent parts. The conventional prior art way to ship modular headliners vertically is in pouches that hang from the upper bars of a shipping rack. As the parts increase in weight and size, however, two people are required to remove the headliner from the pouch, which becomes an ergonomic issue for the operator and also requires a longer cycle time. There are alternative racks for horizontal shipping in which the parts rest in rolling tubes but they have lower part density for the same size rack and they are difficult to use with an assist tool, such as a forklift modified to lift headliners.

It is desirable, therefore, to provide an improved and cost-effective means for supporting a plurality of objects having indexing properties for moving the objects. It is desirable to provide a means for hanging objects that also provides frontal access to the hanging objects for easy removal with an assist tool. It is also desirable to provide a rack for hanging vehicle headliners and having frontal access to the hanging headliner for easy removal with or without an assist tool.

SUMMARY OF THE INVENTION

The present invention concerns an indexing parts rack for supporting a plurality of objects. The indexing parts rack includes an elongated track having a longitudinal axis and at least one hanger assembly mounted on the track. The hanger assembly is movable along the track in a direction of the longitudinal axis and is also rotatable about the longitudinal axis. The parts rack also includes a stop positioned adjacent the track whereby when no object is supported from the hanger assembly, the hanger assembly assumes a first radial position relative to the longitudinal axis to enable the hanger assembly to move along the track past the stop. When an object is supported from the hanger assembly, the hanger assembly rotates relative to the longitudinal axis to a second radial position to engage the stop and prevent the hanger assembly from moving past the stop along the track.

The indexing parts rack is preferably adapted to be attached to a frame disposed within a shipping container. The rack is designed to fit inside current production shipping containers.

The parts rack according to the present invention is preferably two rows of hooks (one row per side of a shipping container) from which the parts are hung. The weight of the part combined with the tension generated by the angle of the hooks holds the part in place when the part is attached. Each hook is attached to a separate hanger assembly. Each hanger assembly includes an upper roller and a lower roller with concave radiuses, which rollers are rotatably mounted to a housing and positioned on opposite sides of an elongated tube. The concave shape of the rollers conforms to an outer surface of the tube, permits movement along the tube and perpendicular swivel relative to a longitudinal axis of the tube. Alternatively, the outer surfaces of the rollers have a V-shaped groove that conforms to the outer surface of the tube, permits movement along the tube and perpendicular swivel relative to a longitudinal axis of the tube. The tubes from which the hooks hang are positioned parallel and spaced apart wider than the width of the parts. Thus, when the parts hang from one of the hooks on each of the tubes, the hooks and the hanger assemblies are rotated at an angle inclining towards the centerline of the container. The distance separating adjacent ones of the parts is dictated by the thickness of the housing which covers each hanger assembly. Each of the tubes forms a continuous track with a generally horizontal upper portion, a lower portion inclined downwardly from front to rear of the container, and a pair of curved portions connected to corresponding ends of the upper and lower portions.

In operation, at the point of part installation, the container is tipped forward a few degrees, which allows the hanger assemblies to move to the front under the influence of gravity to push the parts forward. When the hooks are at an angle, the housing of the first hanger assembly rests against the stop member in the front of the container, which stops further travel until the part is removed. When the first part is removed from the container by lifting it from the hooks, the weight of the hooks makes the hanger assemblies move to an almost vertical, unengaged position. In that position the housing no longer contacts the stop member and the hanger assemblies are free to roll forward and around the front curved portions of the tubes. The empty hanger assemblies advantageously collect in the lower portion of the tube for future reuse.

The parts are preferably loaded into the container through the rear and are removed from the front. Because the present invention allows direct frontal access to the part, an operator can easily remove the part by lifting it just enough to release the hooks (approximately one inch). If the part is too large or heavy for a single operator to manually remove, an assist tool especially designed for this type of rack can be used. In the case that some parts have a large width, a set of empty hooks can be placed in between the parts, which doubles the space between the large-width parts. The height of the tubes and the length of the hooks are adjustable. In this way, the parts rack can be easily and advantageously modified for numerous programs.

The present invention advantageously eliminates damage to the parts during shipping, and increases part density in the container compared to the prior art pouch or horizontal shipping racks. In the case of a headliner, it allows easier access for operators to manually remove the headliners with or without an assist tool, which causes a reduction in plant cycle time, reduces ergonomic stressors and, if combined with a load assist tool, can result in a labor savings as well.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
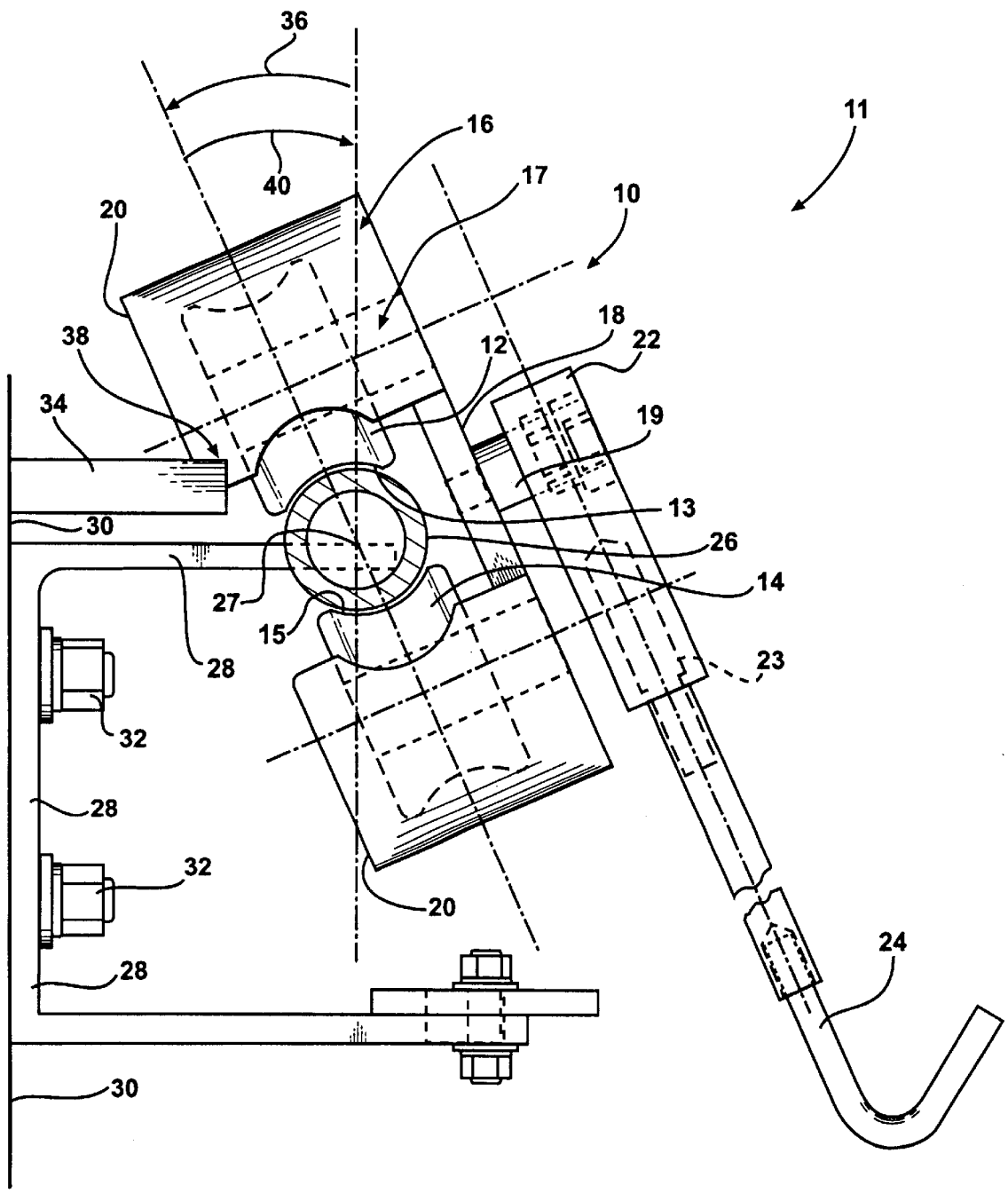
FIG. 1 is a front view of an indexing storage rack in accordance with the present invention shown with a hanger assembly in an engaged position in partial cross-section.

In FIG. 1, a hanger assembly in accordance with the present invention is indicated generally at 10. The hanger assembly 10 includes an upper roller 12 and a lower roller 14 disposed in and rotatably attached to a hanger assembly housing 16. The rollers 12 and 14 are preferably attached to the hanger assembly housing 16 by an associated ball bearing and axle assembly 17 or similar rotatable attachment means, such as a roller bearing or the like. The hanger assembly housing 16 includes a plate 18 and a pair of shrouds 20. The plate 18 extends in a generally vertical plane and has the assemblies 17 mounted on a first surface thereof. The shrouds 20 are semicircular with each extending about a portion of the associated one of the rollers 12 and 14 and being attached to the plate 18. A hook bracket 22 is rotatably attached to a second surface of the plate 18 of the hanger assembly housing 16 by a ball bearing and axle assembly 19 or similar rotatable attachment means, such as a roller bearing or the like. A hook member 24 attaches to a lower surface of the hook bracket 22 and extends downwardly therefrom. Preferably, a shank of the hook member 24 is received in an aperture 23 in the lower surface of the hook bracket 22 and may be attached at a number of different points in the aperture, such as by a threaded connection or by set screws (not shown), in order to vary the vertical position of the hook member 24. The hook member 24 is operable to attach to a part (not shown), such as an automotive headliner, that is to be supported by the hanger assembly 10.

The rollers 12 and 14 each have a concave outer surface 13 and 15 respectively to cooperate with an outer surface of an elongated tube 26 and are preferably constructed of steel, hard plastic, or similar material. Alternatively, the rollers 12 and 14 each have an outer surface having a V-shaped groove (not shown) that conforms to the outer surface of the tube 26. The spacing between the two bearing and axle assemblies 17 and the width of the surfaces 13 and 15 ensures that the rollers 12 and 14 remain engaged with the tube 26. The rollers 12 and 14 allow the hanger assembly 10 to be moveable along a longitudinal axis (see FIG. 3) of the tube 26. The tube 26 is attached to a mounting member 28 extending outwardly from a surface 30, such as an interior wall of a shipping container. The mounting member 28 is preferably an angle iron or similar shape and is attached to the surface 30 by a plurality of fasteners 32. A stop member 34 is attached to the surface 30 adjacent the mounting member 28 and extends outwardly from the surface 30 towards the hanger assembly 10. The hanger assembly 10, the stop member 34, and the tube 26, together form an indexing storage rack according to the present invention, indicated generally at 11.

The hanger assembly 10 is shown in FIG. 1 in an engaged position that the hanger assembly 10 assumes when the part is hung from the hook 24. The hanger assembly 10 is rotatable about a central axis 27 of the tube 26. When the part is hung from the hook 24, the hanger assembly 10 rotates about the central axis 27 of the tube 26 in an engaging direction indicated by an arrow 36 to the engaged position as shown. When in the engaged position, a portion 38 of the hanger assembly housing 16, such as the upper shroud 20, contacts the stop member 34, which prevents any further movement of the hanger assembly 10 along the longitudinal axis of the tube 26.

Figure 2:
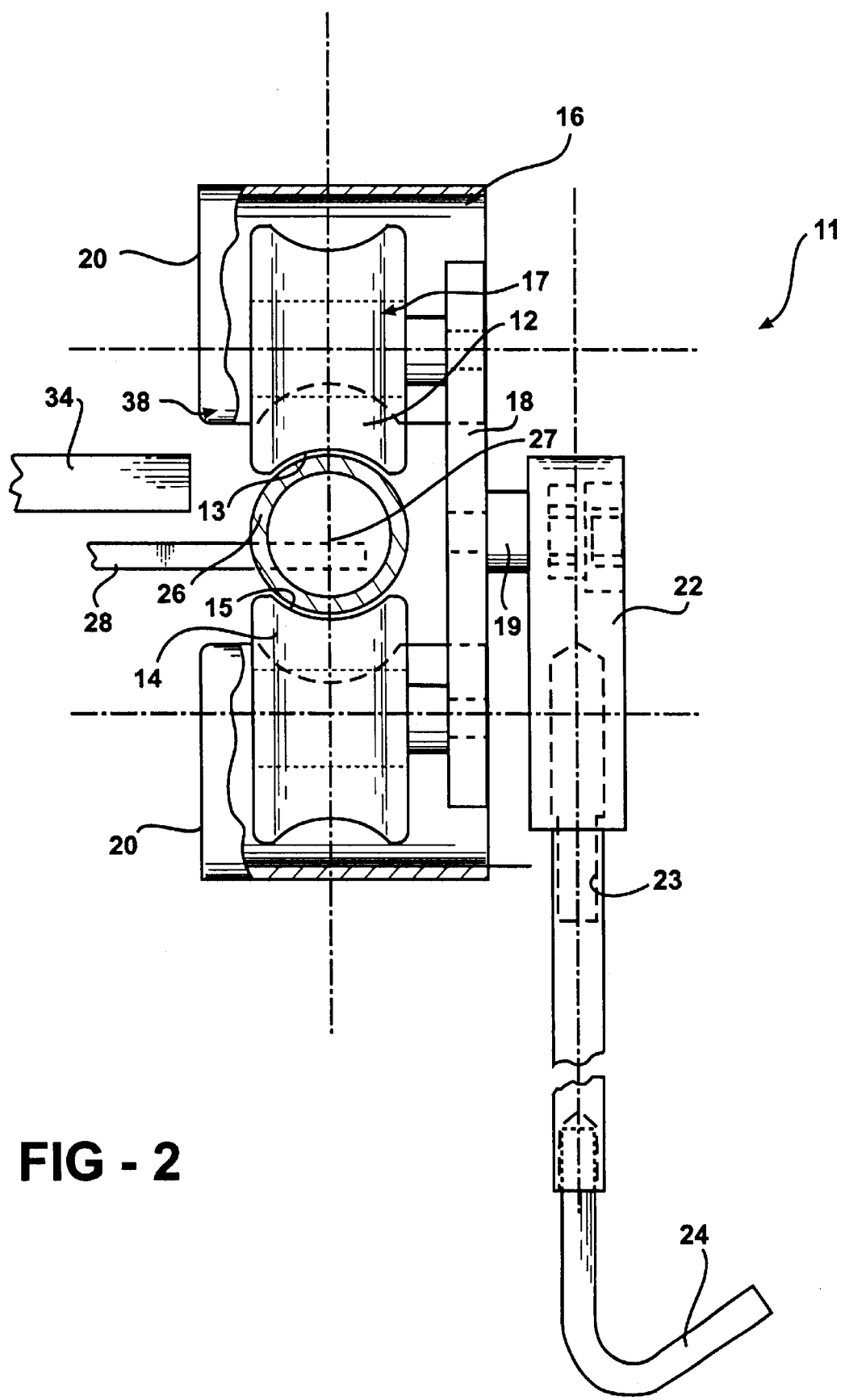
FIG. 2 is a front view of the indexing storage rack in FIG. 1 shown with the hanger assembly in an unengaged position in partial cross-section.

Referring now to FIG. 2, the hanger assembly 10 of FIG. 1 is shown in an unengaged position, which is the position that the hanger assembly 10 assumes when the part is not hung from the hook 24. Because no part is attached to the hook 24, the weight of the hanger assembly 10 allows the hanger assembly 10 to move in an unengaging direction indicated by an arrow 40, in FIG. 1, to the generally vertical orientation of the unengaged position. In the unengaged position, the portion 38 of the hanger assembly housing 16 does not contact the stop member 34, which allows movement of the hanger assembly 10 along the longitudinal axis of the tube 26 since the mounting member 28 can pass between the shrouds 20.

Figure 3:
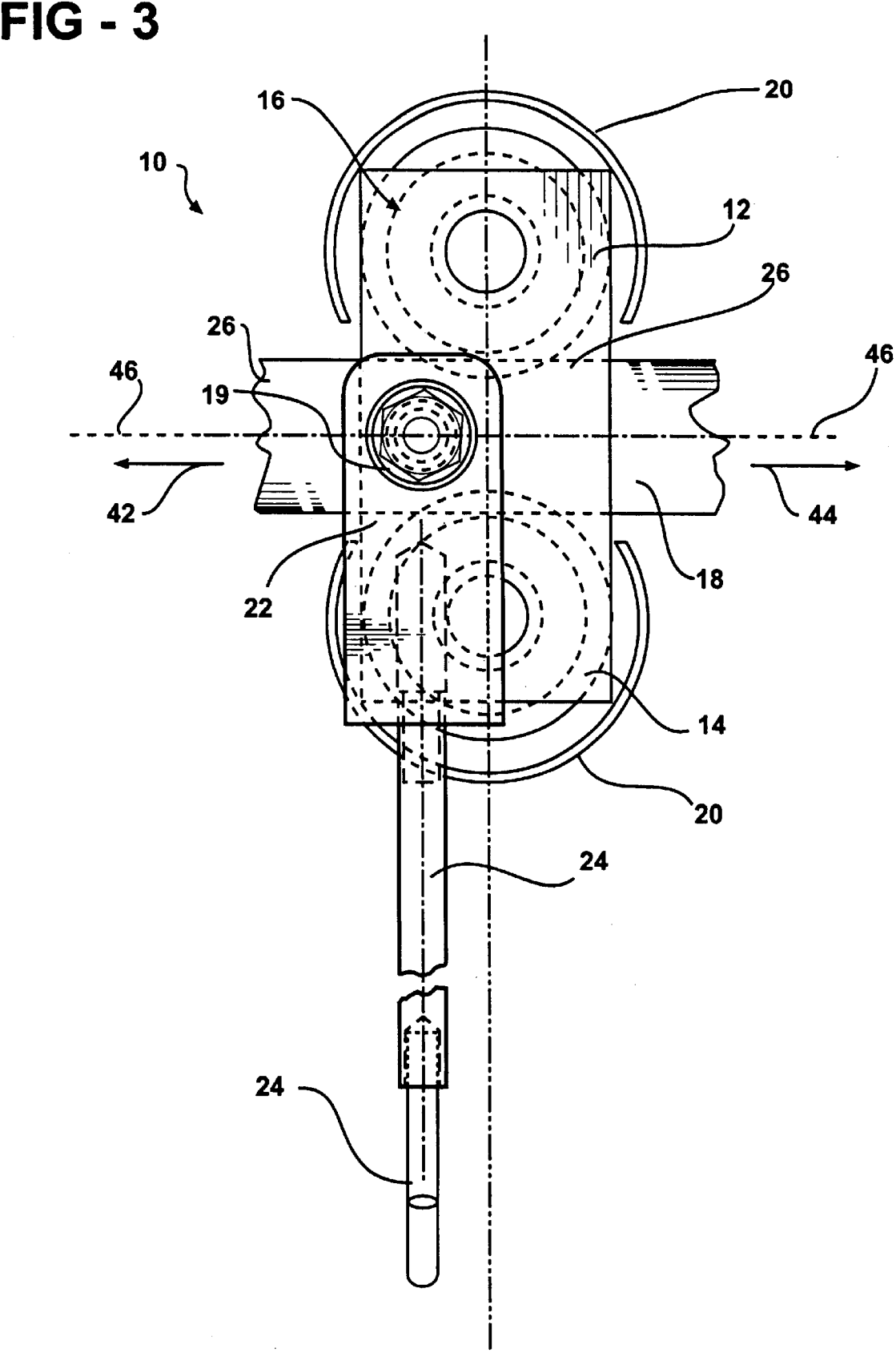
FIG. 3 is a partial cross-sectional side view of the indexing storage rack hanger assembly shown in FIG. 1.

Referring now to FIG. 3, a side view of the hanger assembly 10 is shown. The rollers 12 and 14 are operable to allow the hanger assembly 10 to move in a first direction, indicated by an arrow 42, and a second direction, indicated by an arrow 44, along a longitudinal axis 46 of the tube 26. The hook bracket 22 is rotatably attached to the first surface of the plate 18 of the hanger assembly housing 16.

Figure 4:
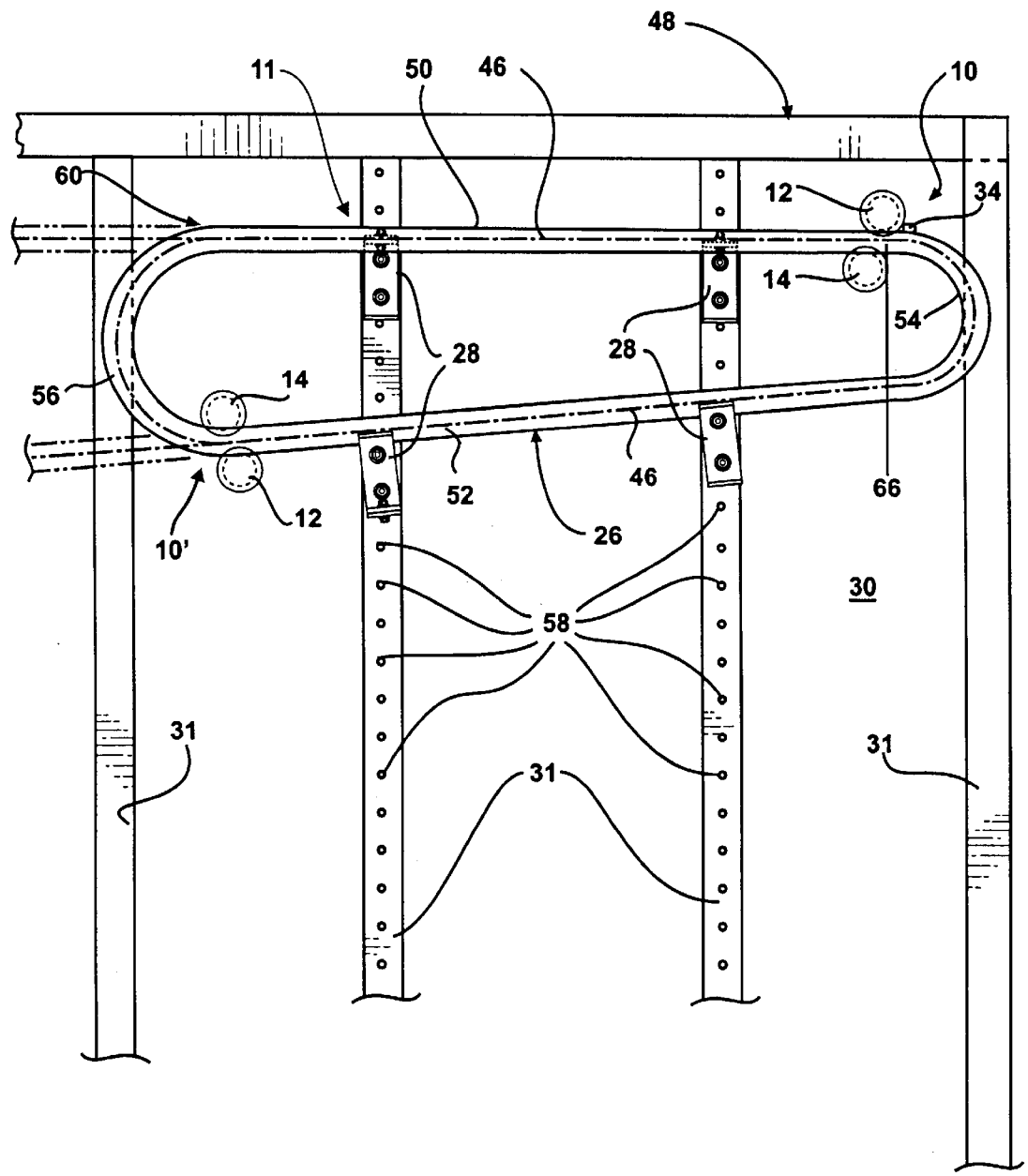
FIG. 4 is a side elevation view of the indexing storage rack shown in FIG. 1 mounted in a shipping container.

Referring now to FIG. 4, the indexing storage rack 11 is shown attached to the surface 30 that forms a side wall of a shipping container 48 having a plurality of frame members 31 with the front of the container shown on the right in the drawing. Alternatively, the indexing storage rack 11 is attached to respective interior surfaces of a plurality of vertical frame members (not shown) that form the frame of a shipping container (not shown). The tube 26 is formed with a generally horizontal upper portion 50, a lower portion 52 inclined downwardly toward a rear of the shipping container, a front curved portion 54 connecting front ends of the portions 50 and 52, and a rear curved portion 56 connecting rear ends of the portions 50 and 52 to define a continuous track having the longitudinal axis 46. The upper roller 12 and the lower roller 14 of a first hanger assembly 10 and a second hanger assembly 10' are shown movably attached to the tube 26. The track tube 26 is attached to the surface 30 by a plurality of the mounting members 28. The surface 30 includes a plurality of attachment points 58 formed thereon. The attachment points 58 allow the tube 26 and mounting members 28 to be attached at various vertical points along the surface 30, allowing the indexing storage rack 11 to be utilized for parts of varying size. The stop member 34 is preferably located adjacent a junction of the front curved portion 54 and the upper portion 50 of the tube 26. Another stop member (not shown), similar to the stop member 34 of FIGS. 1 and 2, is preferably located at a point 60 adjacent a junction of the rear curved portion 56 and the upper portion 50 of the tube 26, to prevent the hanger assemblies 10 and 10' from rolling from the upper portion 50 and along the rear portion 56 down to the lower portion 52 of the tube 26.

Figure 5:
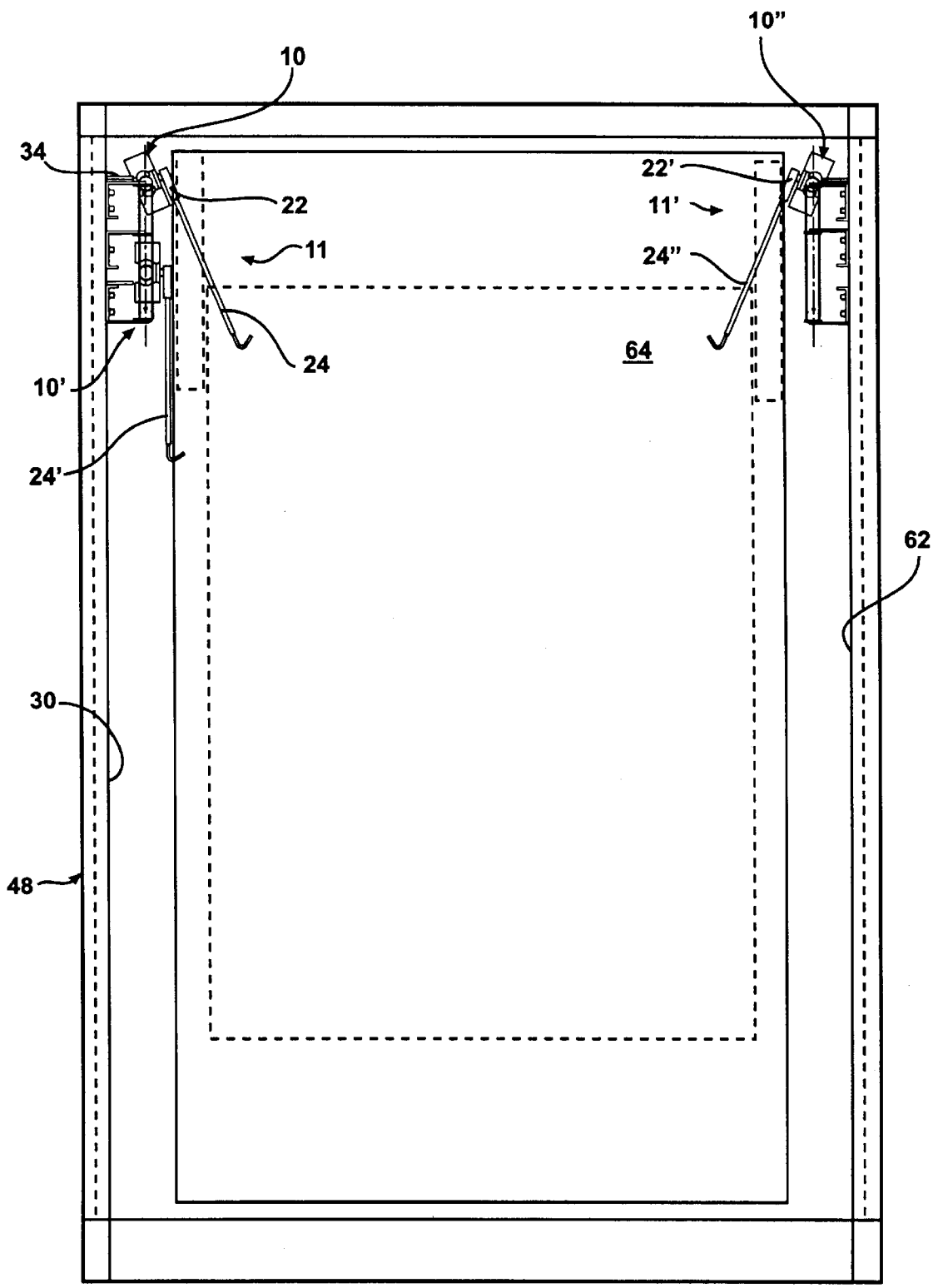
FIG. 5 is a front elevation view of the indexing storage rack and container of FIG. 4.

Referring now to FIG. 5, the shipping container 48 is viewed from an open front side showing the indexing storage rack 11 attached to the side wall surface 30 and a similar indexing storage rack 11' attached to an opposite side wall 62. The first hanger assembly 10 is shown in an engaged position with the hook member 24 attached to a part 64, such as an automotive headliner, adjacent one upper corner of the part. When the hook member 24 is under tension, and the hanger assembly 10 is in the engaged position, the hanger assembly housing 16 contacts the stop member 34, preventing any movement of the hanger assembly 10 toward the front of the container 48. The second indexing storage rack 11' has a hook member 24" attached to the part 64 near another upper corner opposite from the hook member 24.

In operation, a part, such as the part 64 of FIG. 5, is attached to the hook members 24 and 24". The weight of the part 64 causes the hanger assemblies 10 and 10" to rotate about the longitudinal axis 46 of each of the track tubes 26 in the engaging direction 36 until the hanger assemblies 10 and 10" reach the engaged position of FIG. 1. Preferably, the container 48 is tilted at the point of use, such as during loading of the parts 64 in the container 48, by raising the rear of the container 48 enough for the hanger assemblies 10 and 10" to move from the rear of the container 48 where the parts 64 are loaded to the front of the container 48 under the influence of gravity. During storage and shipping, the container 48 is level. When ready for use, such as during unloading of the parts 64 from the container 48, the rear of the container 48 is again raised enough for the hanger assemblies 10 and 10" to move towards the front of the container 48 and the part 64 is removed from the hook 24 or hooks 24 and 24". After the part 64 is removed from the hook 24, gravity allows the hanger assembly 10 to return to the unengaged position of FIG. 2, where the portion 38 of the hanger assembly housing 16 no longer contacts the stop member 34. Because the portion 38 no longer contacts the stop member 34, the hanger assembly 10 is free to move along the longitudinal axis 46 of the tube 26 from the upper portion 50, around the front curved portion 54 and onto the lower portion 52 to move under the influence of gravity toward the rear portion 56 of the tube 26. During this movement the hook member 24 points downwardly because the hook member 24 rotates about the ball bearing and axle assembly 19. The hanger assembly 10 travels along the lower portion 52 of the tube 26 until the hanger assembly 10 reaches the junction of the lower portion 52 and the rear portion 56 of the tube 26, which acts as a natural stop and allows for a plurality of hanger assemblies 10 to be collected at the junction of the lower portion 52 and the rear portion 56 of the tube 26 for future reuse. Preferably, more than one hanger assembly 10 is installed on the tube 26, allowing more than one part 64 to be stored on the indexing storage rack 11. If the part 64 is too large, multiple hanger assemblies 10 are installed and the parts 64 are attached to every other hanger assembly 10 or every third hanger assembly 10 in order to achieve proper spacing between the parts 64.

In accordance with the provisions of the patent statutes, the present invention has been described in what is considered to represent its preferred embodiment. However, it should be noted that the invention can be practiced otherwise than as specifically illustrated and described without departing from its spirit or scope. For example, while the present invention has been described utilizing two hanger assemblies, those skilled in the art will recognize that one, two, or three or more hanger assemblies may be utilized while remaining within the scope of the present invention.

What is claimed is:

1. An indexing parts rack for supporting a plurality of objects comprising:
   an elongated track having a longitudinal axis;
   at least one hanger assembly mounted on said track, said hanger assembly being movable along said track in a direction of said longitudinal axis and being rotatable about said longitudinal axis; and
   a stop positioned adjacent said track such that said hanger assembly is able to move along said track past said stop when said hanger assembly assumes a first radial position relative to said longitudinal axis in which no object is supported on said hanger assembly and said hanger assembly is prevented from moving past said stop when said hanger assembly assumes a second radial position relative to said longitudinal axis to engage said stop when an object is supported on said hanger assembly.

2. The parts rack according to claim 1 wherein said elongated track is continuous having upper and lower straight portions joined by curved end portions.

3. The parts rack according to claim 1 wherein said hanger assembly includes a first roller and a second roller oppositely engaging said track, said first and second rollers being rotatably attached to a housing, and a hook member attached to said housing.

4. The parts rack according to claim 1 wherein said elongated track is attached to a surface in a shipping container.

5. The parts rack according to claim 4 wherein said shipping container includes a plurality of vertically spaced apart attachment points and said elongated track is attached to one of said attachment points on said surface of said shipping container.

6. An indexing parts rack for supporting a plurality of objects comprising:
   a shipping container having opposed planar walls;
   at least one elongated track having a longitudinal axis, said track mounted on at least one of said walls;
   at least one hanger assembly mounted on said track, said hanger assembly being movable along said track in a direction of said longitudinal axis and being rotatable about said longitudinal axis; and
   a stop mounted on said wall and positioned adjacent said track such that said hanger assembly is able to move along said track past said stop when said hanger assembly assumes a first radial position relative to said longitudinal axis in which no object is supported on said hanger assembly and said hanger assembly is prevented from moving past said stop when said hanger assembly assumes a second radial position relative to said longitudinal axis to engage said stop when an object is supported on said hanger assembly.

7. The parts rack according to claim 6 wherein said elongated track is continuous having upper and lower straight portions joined by curved end portions.

8. The parts rack according to claim 6 wherein said hanger assembly includes a first roller and a second roller oppositely engaging said track, said first and second rollers being rotatably attached to a housing, and a hook member attached to said housing.

9. The parts rack according to claim 8 wherein said hook member is operable to be attached to said housing at various points along the length of said hook member.

10. The parts rack according to claim 6 wherein said walls of said container include a plurality of vertically spaced apart attachment points and said elongated track is operable to be attached to a one of said attachment points.

11. An indexing parts rack for hanging a plurality of objects in a container, the container having a pair of spaced apart side walls, said indexing parts rack comprising:
   at least one pair of continuous tubes each adapted to be attached to one of the side walls of the container, said tubes having an upper portion and a lower portion connected by a forward portion and a rear portion;

at least one pair of hanger assemblies, each hanger assembly being movably disposed on an associated one of said tubes;

at least one pair of hook members, each said hook member being attached to an associated one of said hanger assemblies; and at least one pair of stop members, each stop member adapted to be mounted in the container adjacent an associated one of said tubes;

said hanger assemblies move from a vertical position to an inward position by the weight of an object that is attached to and hung from said pair of hook members when said hanger assemblies are on said upper portions of said tubes and said indexing parts rack retains the object by each of said hanger assemblies contacting said stop members, said hanger assemblies return to said vertical position and do not contact said stop members when the object is removed from said hook members, and said hanger assemblies are free to move to said lower portion of said tubes.

12. The parts rack according to claim 11 wherein each of said hanger assemblies includes a pair of rollers oppositely engaging said track, said rollers being rotatably attached to a housing, and said associated hook member being rotatably attached to said housing.

13. The parts rack according to claim 11 wherein each of said lower portions of said tracks is downwardly inclined from said forward portion to said rear portion.

14. The parts rack according to claim 11 wherein said hook member is operable to be attached to said hanger assembly at various points along the length of said hook member.

* * * * *